May 7, 1968 N. BRINK ET AL 3,381,420
INSULATION MATERIAL
Filed April 30, 1965
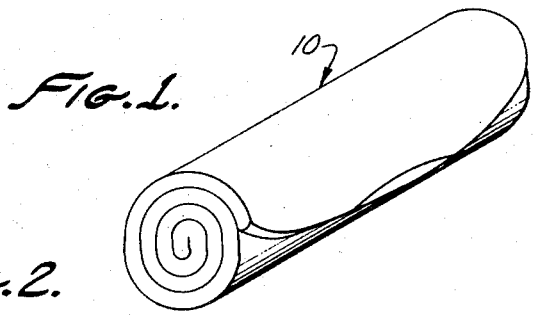
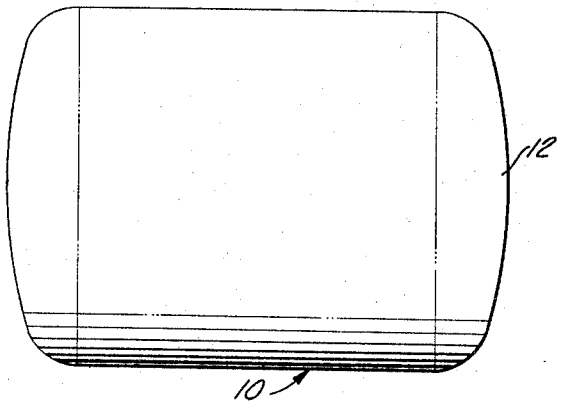
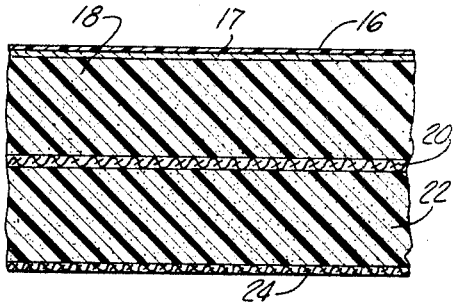
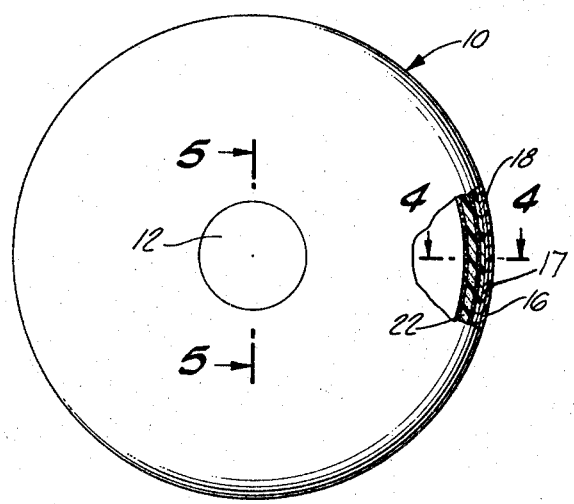
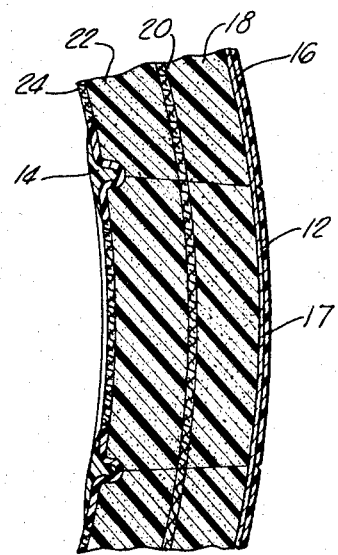
INVENTORS.
NORMAN BRINK
HERMAN HOLLAND
ROBERT G. SIMONEAU
DENNIS STEVENS
STEVEN YURENKA
BY Lyon & Lyon
ATTORNEYS

3,381,420
INSULATION MATERIAL
Norman Brink, Herman Holland, and Robert G. Simoneau, San Diego, Dennis Stevens, La Jolla, and Steven Yurenka, Huntington Beach, Calif., assignors to Whittaker Corporation, Los Angeles, Calif., a corporation of California
Filed Apr. 30, 1965, Ser. No. 452,152
12 Claims. (Cl. 52—2)

ABSTRACT OF THE DISCLOSURE

This patent describes a structural material having a layer of polymeric flexible foam material with interconnecting cells, and adhered to at least one side of said layer an impervious metallized thin plastic film wherein the metallized surface faces the foam material. This patent further describes a collapsible structure having supporting walls made of the structural material.

---

This invention pertains to a novel flexible structural material which can be expanded and compressed and to its use in the construction of thin-walled expansible structures.

Expansible structures of the air-inflated type as ordinarily constructed, depend upon a constant internal positive pressure differential for their operation. The structure is usually kept in shape by pressurizing the entire enclosed volumn of the structure. In the case of a relatively thin structure, such as an air mattress, the two faces must be fastened together at frequent intervals to produce the desired shape. In the case of large structures, such as radomes, air under pressure must be constantly introduced into the structure to make up for leakage and to keep the structure from collapsing. As soon as the supply of air is interrupted, these air-inflated structures will begin to collapse due to the loss of the pressure differential through air leakage. The maintenance of the required air pressure involves the use of auxiliary gas pressurizing mechanism. The mechanisms require periodic servicing in all cases, and are particularly susceptible to malfunction under extremes of temperature, humidity, and the like.

In contrast thereto, according to the present invention, the expansion and rigidization of the collapsible structure, being inherent in the properties of the structural material employed in the walls, is completely dependable. The present invention provides a means of expanding and rigidizing a tightly folded and compact collapsible structure from an extremely small packaged volume to an extremely large expanded volume. This action takes place through the inherent elastic property of the core used in the structural material without the benefit of any mechanical auxiliary systems, such as gas pressurization or servo machanisms which are often complex and unreliable.

Accordingly, it is an object of this invention to provide a novel structural material for use in collapsible structures which does not require the maintenance of a pressure differential for operation.

It is also an object of this invention to provide a novel structural material for use in collapsible structures which does not require the use of gas pressurizing, servo mechanisms or other mechanical devices for operation.

Still another object of this invention is to provide a structural material of low cost which is unique in combining the properties of flexibility, self-support, weather proofness, durability under hard usage and rough handling, and resiliency.

Still another aspect, it is an object of this invention to provide an improved structural material which is flexible and possesses superior insulating properties. More particularly, it is an object of this invention to provide a structural material in which the thermo-insulative value of foam and the thermo-reflective value of metallized film are used in minimum quantities to achieve optimum thermal deficiency.

These, and other objects of the invention will, it is believed, be apparent from the more detailed description which follows.

Briefly, the structural material of this invention comprises a flexible polymeric foam material having interconnecting cells as the core material, and adhered to at least one side of the core, an impervious metallized plastic film. The metallized plastic film is adhered to the flexible polymeric foam material with the metallized side of the film facing the core. In general, it is preferred that both sides of the core material be covered with the metallized plastic film, and that the polymeric foamed core have a thickness of from about 0.2 inch to about 10 inches, and that the metallized plastic film have a thickness of from about 0.001 inch to about 0.010 inch.

It will be understood that several thicknesses of the basic structural material may be bonded together. The extent to which such bonding is desirable is dependent upon the size and volume of the structure to be built from the structural material, as well as the amount of thermo-insulation and resiliency required. Optionally, there may also be included within the core, or bonded between thicknesses of the basic structural material, or as a backing member, one or more layers of woven fiber glass or other cloth-like materials to increase the impact resistance of the structural material.

It will be appreciated that the structural material of this invention can be evacuated and packaged by folding, compressing, squeezing, or by the application of light vacuum, or by a combination of these actions, since the cells in the foam are interconnected. Thus, the metallized plastic film faces may be viewed as a vacuum bag, which prevent air from re-entering the foam from the sides while it is being removed from the ends of the structural material. When the air is evacuated, the structural material collapses and squashes down to about one-tenth its normal thickness. In this condition, the structural material or any thin-walled structure constructed of it, which would normally roll up to a bulky package, can be rolled up to occupy only one-tenth of the normal space. As soon as air is allowed to enter the structural material, the stored potential energy of the core is released. The structural material then expands and pops back up to its normal size. While not required, air or other gas can be forcibly introduced during the expansion process to assist the structural material to assume its original shape, or to accelerate the restoration of the structural material to its orginal shape. In some cases, it may be desirable to harden the foam after the structural material has returned or been inflated to its final shape. This may be accomplished by inflating the core cells with a suitable reactive gas in lieu of air. The foamed core may also be hardened by forcing a catalyzed resin into the cells which sets up to harden the foam.

The structural material of this invention is particularly adapted for use in hollow collapsible space structures. The inherent expansibility of the structural material eliminates the need for mechanical parts or other hardware that can freeze or weld in space, preventing expansion. Illustrative of such space structures is that shown in the accompanying drawings in which:

FIGURE 1 is a view of the space structure in collapsed form and rolled up.

FIGURE 2 is a side view of the structure of FIGURE 1 shown in expanded form.

FIGURE 3 is an end view of the expanded space structure.

FIGURE 4 is a cross-sectional view of the wall of the space structure taken along the line 4–4' in FIGURE 3.

FIGURE 5 is a cross-sectional view taken along the line 5–5' in FIGURE 3.

As shown in FIGURE 1, the space structure 10 can, when collapsed, be tightly rolled up for ready transport in a space vehicle. This feature is of manifest value in view of the limited available cargo volume in the existing space vehicles.

When it is desired to expand the structure, the package is simply unrolled and the stored potential energy in the core will cause the structure to assume the expanded, generally ellipsoidal shape shown in FIGURE 2. Alternatively, the expansion may be assisted by the injection of gas into the cells. The typical space structure depicted is normally fitted with a door 12 for access to the interior. The door may also be made of the structural material of this invention as shown in the drawings, or of other light weight material, such as fiber glass. The structure 10 and door 12 are normally made to form an airtight fit, such as by the use of a seal 14 therebetween. Once the structure is expanded, it can be permanently rigidified in any of the ways discussed above.

The flexible film used for facing the core may be a meallized Mylar (polyethylene terephthalate), polyethylene, polypropyline, Saran (vinvyl chloride-vinylidene chloride copolymer), or other suitable impervious flexible film material. In general, the metal coating 17 is deposited by standard techniques, such as vacuum deposition. The preferred metallizing material is aluminum. The metallized film may be bonded to the polymeric foam core by any well-known adhesive material. The nature of the adhesive bond is not entirely known. However, the bond is such that adhesion is maintained during repeated flexing over a wide range of temperatures.

The particular structural material employed in the walls of the space structure, and shown in cross-section in FIGURE 4, comprises a flexible film of Mylar 16 containing a metal coating 17, said metal coated Mylar having an overall thickness of about 0.003 inch, a first layer of polyurethane foam 18 having a thickness of about 1 inch, a layer of glass cloth 20 having a thickness of 0.010 inch, a second polyurethane foam layer 22 having a thickness of 1 inch, and a backing layer 24 comprising cloth and Saran resin having a thickness of about 0.05 to 0.06 inch. The cloth interlayer and backing layers increase the impact strength of the walls and hence, improve the protection afforded by the structure against meteroids and the like.

As will be apparent to those skilled in the art, the space structure depicted in the drawing, is merely illustrative of the many collapsible space structures which can be built from the novel structural material of this invention.

Typical of other thin-walled collapsible structures which may be prepared from the structural material of this invention, are portable ice boxes, shelters and tents of all types, portable cabins, shopping bags, and picnic and lunch baskets.

The polymeric foam for use in the core of the sandwich structure may be composed of polyurethane, polyester, epoxy, vinyl, rubber, latex and other synthetic resins. The chemical composition of the foam can vary over a wide range, not only as to the polymeric material per se, but also as to the other additives and supplemental agents which may be present, such as plasticizers, fillers and blowing agents. The composition of these foams is already known and the blending, mixing and formation thereof is familiar to those skilled in the art. Accordingly, further details regarding the preparation of the foam will not be included in this patent.

The structural material of this invention can also be used not only to fabricate thin-walled collapsible structures, but may also be used to insulate tanks, pipes, conduits, and the like. The material is also useful as automobile insulation, shock-resistant packing, insulation for refrigerated trucks and railroad cars, and the like.

Having fully described the invention, it is intended that it be limited only by the lawful scope of the appended claims.

We claim:

1. A novel collapsible structural material comprising a layer of a polymeric flexible foam material having interconnecting cells, and adhered to at least one side of said layer, an impervious metallized thin plastic film having a metallized surface facing said foam material.

2. A novel collapsible structural material comprising a layer of a polymeric flexible foam material having interconnecting cells, and adhered to both sides of said layer, an impervious metallized thin plastic film having a metallized surface facing said foam material.

3. A novel collapsible multi-layer structural material comprising a woven cloth backing member, adhered to said backing member, a first layer of polymeric flexible foam material having interconnecting cells, adhered to said first foam layer, a woven cloth interlayer, adhered to said interlayer, a second layer of said foam material, and adhered to said second layer of foam material, a layer of impervious metallized thin plastic film, the metallized surface of said film facing said foam material.

4. A novel collapsible structural material comprising a layer of a polyurethane flexible foam material having interconnecting cells, and adhered to at least one side of said layer, an impervious aluminized thin plastic film having an aluminized surface facing said foam material.

5. A novel collapsible multi-layer structural material comprising a woven cloth backing member, adhered to said backing member, a first layer of polyurethane flexible foam material having interconnecting cells, adhered to said first foam layer, a woven cloth interlayer, adhered to said interlayer, a second layer of said foam material, and adhered to said second layer of foam material, a layer of impervious aluminized thin plastic film, the aluminized surface of said film facing said foam material.

6. A novel collapsible structural material comprising a layer of a polyurethane flexible foam material having interconnecting cells, and adhered to at least one side of said layer, an impervious aluminized thin polyethylene terephthalate film having an aluminized surface facing said foam material.

7. A collapsible thin-walled hollow structure having supporting walls which comprise a layer of a polymeric flexible foam material having interconnecting cells, and adhered to at least one side of said layer, an impervious metallized thin plastic film having a metallized surface facing said foam material.

8. A collapsible thin-walled hollow structure having supporting walls which comprise a layer of a polymeric flexible foam material having interconnecting cells, and adhered to both sides of said layer, an impervious metallized thin plastic film having a metallized surface facing said foam material.

9. A collapsible thin-walled hollow structure having supporting walls which comprise a multi-layer structural material having a woven cloth backing member, adhered to said backing member, a first layer of polymeric flexible foam material having interconnecting cells, adhered to said first foam layer, a woven cloth interlayer, adhered to said interlayer, a second layer of said foam material, and adhered to said second layer of foam material, a layer of impervious metallized thin plastic film, the metallized surface of said film facing said foam material.

10. A collapsible thin-walled hollow structure having supporting walls which comprise a layer of a polymeric flexible foam material having interconnecting cells, and adhesively bonded to at least one side of said layer, an impervious metallized thin plastic film having a metallized surface facing foam material.

11. A collapsible thin-walled hollow structure of generally ellipsoidal configuration having at one end thereof an air-tight door, the supporting walls of said structure comprising a layer of a polymeric flexible foam material having interconnecting cells, and adhered to at least one side of said layer, an impervious metallized thin plastic film having a metallized surface facing said foam material.

12. A collapsible thin-walled hollow structure of generally ellipsoidal configuration having at one end thereof an air-tight door, the supporting walls of which comprise a multi-layer material having a woven cloth backing member, adhered to said backing member, a first layer of polymeric flexible foam material having interconnecting cells, adhered to said first foam layer, a woven cloth interlayer, adhered to said interlayer, a second layer of foam material, and adhered to said second layer of foam material, a layer of impervious metallized thin plastic film, the metallized surface of said film facing said foam material.

References Cited

UNITED STATES PATENTS

| | | | |
|---|---|---|---|
| 2,819,724 | 1/1958 | Barker | 52—2 |
| 2,996,212 | 8/1961 | O'Sullivan | 220—1 |
| 3,000,464 | 9/1961 | Watters | 161—1 |
| 3,024,941 | 3/1962 | Vanderberg | 244—1 |
| 3,176,933 | 4/1965 | Clemmonts | 244—1 |
| 3,202,998 | 8/1965 | Hoffman | 244—1 |

REINALDO P. MACHADO, *Primary Examiner.*